No. 754,474. PATENTED MAR. 15, 1904.
H. MEHNER.
PROCESS OF MAKING NITROGEN COMPOUNDS FROM ATMOSPHERIC NITROGEN.
APPLICATION FILED JULY 30, 1903.
NO MODEL.
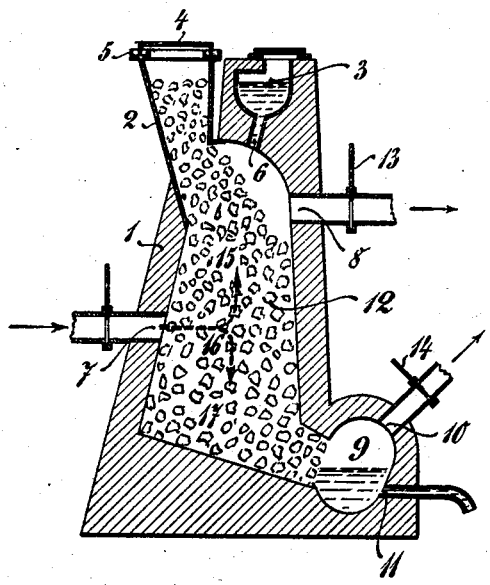

No. 754,474. Patented March 15, 1904.

UNITED STATES PATENT OFFICE.

HERMANN MEHNER, OF STEGLITZ, NEAR BERLIN, GERMANY.

PROCESS OF MAKING NITROGEN COMPOUNDS FROM ATMOSPHERIC NITROGEN.

SPECIFICATION forming part of Letters Patent No. 754,474, dated March 15, 1904.

Application filed July 30, 1903. Serial No. 167,593. (No specimens.)

*To all whom it may concern:*

Be it known that I, HERMANN MEHNER, doctor of philosophy, a subject of the King of Saxony, whose post-office address is No. 5 Humboldtstrasse, Steglitz, near Berlin, Prussia, German Empire, have invented a new and useful Process of Manufacturing Nitrogen Compounds from Atmospheric Nitrogen; and I do hereby declare that the following is a full, clear, and exact description of my invention, which will enable others skilled in the art to which it appertains to make and use the same.

This invention has for its object to improve the process of manufacturing nitrogen compounds—such as cyanids and others, including ammonia and ammonia-salts—from atmospheric nitrogen by causing such nitrogen as in the form of air, producer-gas, or other suitable gaseous mixtures to react with carbon in the presence of alkaline matter, such as hydrates and carbonates of alkaline and earth-alkaline metals. As is well known to those familiar with this branch of chemical industry, the attempts hitherto made to realize the said process on a commercial scale have failed of success. The main difficulties to be overcome are the endothermic nature of the reaction, requiring not only a large quantity of heat, but also a high temperature of such large quantity of heat; the necessity of avoiding as much as possible the formation of carbonic acid because of its heat-absorbing reaction with incandescent carbon and its own decomposing action upon the cyanids and other nitrogen compounds; the alkaline nature of the mixture to be acted upon, whereby the apparatus is subject to rapid destruction; the large cost involved by imperfect utilization of said mixture, and the enormous loss of heat caused by radiation transport to the outside by the escaping gases and secondary reactions, such as reduction of carbonic acid to carbonic oxid by its contact with the incandescent carbon and others. The thermic difficulties offered by the process will be readily understood from the following facts. The reaction represented by the equation $$Na_2CO_3 + 4C + 2N = 2NaCN + 3CO$$

absorbs one hundred and thirty-four thousand eight hundred calories, supposing the cold state at both the begining and the end, whereas for the hot state much more calories are wanted, as the three molecules of CO formed carry away with them out of the furnace 20.4 calories for each degree of their temperature. Now the most perfect combustion represented by the equation $C + O_2 = CO_2$ yields only ninety-seven thousand calories, whereas the combustion represented by the equation $$C + O = CO,$$

which on account of the decomposing action of $CO_2$ upon cyanids, &c., must be favored as much as possible, does not yield more than twenty-nine thousand calories. A known method for introducing heat without oxidizing action under similar conditions and which has been proposed for use in the process of distilling zinc consists in storing up heat in an accumulator, heating a reducing-gas up to the temperature required for the reaction by passing it through said accumulator, conducting the thus-heated gas to the mixture to be treated, returning the cooled gas to said heat-accumulator and from thence to the material, and so on. It is evident that by using gas as a carrier to transport heat to materials only a comparatively small heating effect can be produced, for the reason that each liter of the gaseous medium carries only 0.00005 calory for each degree of its temperature, supposing a temperature of 1365° centigrade. Moreover, voluminous apparatus would be required, and this necessity would result in an enormous loss of heat by radiation. Now I have discovered that the principle the above method is based on becomes well adapted for the purpose of my present invention when an incandescent-fluid heat-carrier obtained by igneous fusion of suitable solid substances is substituted for the gaseous carrier, and, moreover, the operation is carried out in such a manner that this fluid heat-carrier is caused to percolate through a permeable mass of carbon, and that simultaneously an atmospheric nitrogen-carrying gas-current, such as atmospheric air, producer-gas, waste gases of chemical industrial processes and the like is caused to penetrate the mixture of carbon and percolating fluid heat-carrier, the presence of alkaline matter being provided for in suitable manner, and the outflowing igneous heat-carrier being returned to the mass of carbon. Supposing a temperature of 1365° centigrade or $6 \times 273°$ absolute, then, as compared with the gaseous heat-carrier of which each liter at that temperature carries only 0.00005 calory for each degree of its temperature—molten slag, scoria, or cinder, for instance—having a specific heat of 0.3 and specific weight of 3.0 will under like conditions transport into the reaction-chamber 0.9 calory for each degree of temperature by which it surpasses the temperature of said chamber or eighteen thousand times as much heat as would be furnished by a gaseous carrier. A current of incandescent scoria, amounting only to a little more than two liters per second appears as the equivalent of an electric furnace of one thousand horse-power. Moreover, the heat is even less costly than that taken from a heat-accumulator. If a molten metal is used—for instance, iron—the reaction-chamber will be supplied with thirty-nine thousand times as much heat as through the agency of an equal volume of gaseous heat-carrier.

The very essence of my present invention therefore consists in supplying the heat required for the reaction between nitrogen, carbon, and alkaline matter by the agency of an igneous fluid heat-carrier, causing the same to percolate through carbon in the presence of both nitrogen and alkaline matter and within a reducing atmosphere.

A very advantageous mode of carrying out my present invention consists in causing the mixture of carbon and igneous fluid heat-carrier percolating therethrough in the presence of alkali to be penetrated by the atmospheric air or other similar gas containing atmospheric nitrogen at an intermediate zone and causing the current to subdivide within the mixture in a comparatively strong upward current and a comparatively weak downward current. By this the furnace is divided in an oxidizing zone, a reducing zone, and a reacting zone. The oxidizing zone is the upper one, where owing to the larger supply of oxygen the combustion will substantially result in carbonic acid, and consequently a correspondingly large amount of heat is produced, which is taken up by the percolating heat-carrier, the carbonic acid passing out through an exit-opening provided for in the upper portion of the reaction-chamber. The reducing zone is the one below the oxidizing zone, where as a consequence of the smaller supply of oxygen the carbon is burned only to carbonic oxid. The heat generated thereby is added to that of the heat-carrier, and both supply the zone below with the heat necessary for the reaction, and, moreover, said lowest zone is held free from any carbonic acid. From the lowest zone, which is the reacting zone proper, the gases produced are withdrawn at the bottom of the chamber, and the outflowing igneous fluid is returned to the top of the furnace to again percolate through the carbon. In this manner I am enabled to utilize combustion substantially resulting in carbonic acid to supply the heat-carrier with a large amount of additional heat and to prevent the cyanid producing reaction from being disturbed by the presence of carbonic acid, which, on one hand, would exert a decomposing action upon the nitrogen compounds formed and, on the other hand, waste heat by being reduced to carbonic oxid by its contact with the incandescent carbon. As such igneous fluid heat-carrier any suitable molten solid substance may be used—for instance, molten salts, as silicates, preferably alkaline silicates, scoria, slag, cinder, and other suitable compounds or salts, as also molten metals, as iron and the like. Though in general molten metals are more efficient heat-carriers than any other igneous fluid substances, I notwithstanding prefer to use silicates including slag, scoria, or cinder, especially alkaline silicates, including water-glass and the like. In cases where the advantage resulting from the greater heat-transporting capacity of iron or other metals proves to be more preferable those metals may be employed instead of silicates.

I now proceed to describe my improved process in connection with the preferred form of apparatus, reference being had to the accompanying drawing, which represents a vertical section of said apparatus in a diagrammatical manner.

1 is a furnace resembling a shaft-furnace and provided on top with a hopper 2 for supplying it with carbon and a vessel 3 for supplying a continuous current of igneous fluid alkaline slag, said hopper being hermetically closed by a lid 4, dipping into a sand seal 5, and said vessel inclosed in the masonry of the furnace and communicating with the interior thereof through a small channel 6, inclined toward the axis of the furnace. At about the middle of the left-hand side the furnace is provided with an opening 7 for blowing in air, preferably hot air, or other suitable hot gaseous mixtures containing nitrogen taken from the atmosphere, and on the opposite side an exit-opening 8 for gases is arranged at a distance below the mouth of the channel 6. The bottom of the furnace is inclined toward the right-hand side where the furnace communicates with a chamber 9, provided in its upper and lower portion with exit-openings 10 and 11, respectively.

Supposing the furnace to be in operation the carbon consisting of coke divided into suitable pieces and incandescent alkaline slag to which sodium carbonate may be added, if required, being used as a combined heat and alkali carrier. The said slag in passing from the vessel 3 into the furnace is directed by channel 6 toward the axial line of the former, and consequently is caused to percolate through the middle portion or core of the column of coke 12, remaining out of contact with the walls of the furnace. The air is forced in through the lateral opening 7 by a suitable device (not shown) of known construction, and owing to the double draft created by the presence of the two exit-openings 8 and 10 the air-jet is caused to divide within the coke into an upward current and a downward current, as indicated by dotted arrows. The said exit-openings are so regulated, as by means of slides 13 and 14, respectively, that the upward current is strong enough to burn as perfectly as possible to carbonic acid the coke contained in the upper portion or zone 15 of the furnace and that the coke in the portion of zone 16 below is burned as perfectly as possible to carbonic oxid. The igneous slag in percolating first through said zone 15 takes up the heat generated therein, and thus reaches the portion 16 below with a correspondingly-higher heat, whereas the carbonic acid and other gases produced in said zone 15 escape at the top of same through opening 8 to the outside. Moreover, the ashes resulting from the combustion are absorbed by the passing slag and the latter supplied thereby with some oxidized iron. In the lower zone 16 the coke mentioned above is burned to carbonic oxid, the heat thus produced added to the heat brought in by the slag, and the mixture of hot carbonic oxid and nitrogen drawn through the incandescent coke contained in the following zone 17 toward the chamber 9. Simultaneously the iron oxid contained in the slag is reduced to metallic iron, and metallic sodium vapors are extricated from the alkaline slag by the action of the elevated heat. Now incandescent coke, nitrogen, and sodium vapors are brought in most intimate contact with each other in the presence of a catalytic agent at a temperature favorable to their combination into cyanids and other nitrogen compounds capable of being formed under the existing conditions. They enter into combination, and the compounds formed together with the carbonic oxid, unabsorbed nitrogen, and other gases pass into the chamber 9 and out of the same through opening 10 into a separator, (not shown,) where the said compounds are caused to separate from the other gases. The slag leaving the coke collects in the chamber 9 and from thence passes through opening 11 to the outside, where it is taken up in suitable vessels (not shown)—for, instance, shanks provided with lids—and is returned to the chamber 3—for instance, by means of a crane, (not shown)—the alkali absorbed by the production of the nitrogen compounds being compensated by the addition of fresh soda either in the vessel 3 or in the said shanks. In cases where the cyanids and other nitrogen compounds obtained are then converted into ammonia by treatment with steam the sodium carbonate formed may be collected instead of cyanids and used for reëstablishing the suitable proportion of alkali in the slag. When after a number of circulations the igneous slag becomes unfit by the accumulation therein of certain constituents of the ashes, as alumina and the like, it will wholly or partly be replaced by fresh silicate, or a portion of the circulating silicate may be withdrawn at regular intervals and a corresponding quantity of fresh silicate added, or the silicate may be kept fit for use by suitable additions—as, for instance, lime. If required or desired, the silicate may be reheated prior to its arrival in the vessel 3—for instance, by burning gas—and in this case the oxidizing zone above described may be dispensed with.

It is evident that instead of coke coal may be used or pitch or asphalt or any other suitable carbonaceous matter. I therefore wish it to be understood that the term "carbon" as used in the present specification and its annexed claims is intended to include any carbonaceous material suitable for my present purpose. I further wish it to be understood that the term "alkaline matter" used in this specification and its annexed claims is intended to comprise any oxids, hydrates, or carbonates of the alkaline metals and alkaline-earth metals, as all those compounds are known to be true equivalents with regard to the process to be improved by my present invention, and I further wish it to be understood that the term "igneous fluid heat-carrier" as used in the present specification is intended to cover besides silicates, slags, scoria, cinder, and metals any solid salt or substance which is suitable for the purpose in view, and, finally, I wish it to be understood that the term "atmospheric-nitrogen-carrying gas" as used in my specification and annexed claims is intended to embrace not only atmospheric air and producer-gas, but any suitable mixture of gases containing atmospheric nitrogen, such as the waste gases from certain chemical industrial processes and others.

What I claim as my invention, and desire to secure by Letters Patent of the United States, is—

1. The process of manufacturing nitrogen compounds from atmospheric nitrogen which essentially consists in providing a permeable mass of carbon, causing an incandescent-fluid heat-carrier obtained by igneous fusion from solids to percolate through, and simultaneously causing a current of atmospheric-nitrogen-carrying gas to penetrate into, said mass, both in the presence of alkaline matter, withdrawing the nitrogen compounds formed from the zone of reaction, and returning the heat-carrying fluid to the top of the carbon, substantially as and for the purpose stated.

2. The process of manufacturing nitrogen compounds from atmospheric nitrogen which essentially consists in providing a permeable mass of carbon, causing an incandescent-fluid heat-carrier obtained by igneous fusion from solids to percolate through the middle portion of, and simultaneously causing a current of atmospheric-nitrogen-carrying gas to penetrate into said mass of carbon, both in the presence of alkaline matter, withdrawing the nitrogen compounds formed from the reaction zone, and returning the heat-carrying fluid, substantially as and for the purpose stated.

3. The process of manufacturing nitrogen compounds from atmospheric nitrogen which essentially consists in providing a permeable mass of carbon, causing an incandescent-fluid heat-carrier obtained by igneous fusion from solids to percolate in downward direction through the middle portion of, and simultaneously causing a current of atmospheric air to penetrate at an intermediate zone into said mass, both in the presence of alkaline matter, causing the current of air to subdivide within said mass of carbon into a strong upward current burning the carbon in contact therewith substantially to carbonic acid to add heat to the said heat-carrier, and into a weak downward current, burning the carbon in contact therewith to carbonic oxid for further adding heat and preventing the reaction from being disturbed by the presence of carbonic acid, causing the gases to pass from below said carbonic-oxid-generating zone into a separator to separate therefrom the nitrogen compounds formed, and returning the outflowing heat-carrier to the top of the carbon mass, substantially as and for the purpose stated.

4. The process of manufacturing nitrogen compounds from atmospheric nitrogen which essentially consists in providing a permeable mass of carbon, causing an incandescent fluid composed of molten silicate to percolate in downward direction through the middle portion of, and simultaneously causing a current of atmospheric air to penetrate at an intermediate zone into said mass of carbon, both in the presence of alkaline matter, causing the current of air to subdivide within said mass of carbon into a strong upward current, burning the carbon in contact therewith substantially to carbonic acid to add heat to the said heat-carrier, and into a weak downward current, burning the carbon in contact therewith to carbonic oxid for further adding heat and preventing the reaction from being disturbed by the presence of carbonic acid, causing the gases to pass from below said carbonic-oxid-generating zone into a separator to separate therefrom the nitrogen compounds formed, and returning the outflowing heat-carrier to the top of the carbon mass, substantially as and for the purpose stated.

5. The process of manufacturing nitrogen compounds from atmospheric nitrogen which essentially consists in providing a permeable mass of carbon, causing an incandescent fluid, composed of a molten silicate capable of dissolving the ashes of the burned carbon to percolate in downward direction through the middle portion of, and simultaneously causing a current of atmospheric air to penetrate at an intermediate zone into said mass of carbon, both in the presence of alkaline matter, causing the current of air to subdivide within said mass of carbon into a strong upward current, burning the carbon in contact therewith substantially to carbonic acid to add heat to the said heat-carrier, and into a weak downward current, burning the carbon in contact therewith to carbonic oxid for further adding heat and preventing the reaction from being disturbed by the presence of carbonic acid, causing the gases to pass from below said carbonic-oxid-generating zone into a separator to separate therefrom the nitrogen compounds formed, and returning the outflowing heat-carrier to the top of the carbon mass, substantially as and for the purpose stated.

6. The process of manufacturing nitrogen compounds from atmospheric nitrogen which essentially consists in providing a permeable mass of carbon, causing an incandescent fluid composed of molten alkaline silicate to percolate in downward direction through the middle portion of, and simultaneously causing a current of atmospheric air to penetrate at an intermediate zone into said mass of carbon, causing the current of air to subdivide within said mass of carbon into a strong upward current, burning the carbon in contact therewith substantially to carbonic acid to add heat to the said heat-carrier, and into a weak downward current, burning the carbon in contact therewith to carbonic oxid for further adding heat and preventing the reaction from being disturbed by the presence of carbonic acid, causing the gases to pass from below said carbonic-oxid-generating zone into a separator to separate therefrom the nitrogen compounds formed, and returning the outflowing heat-carrier to the top of the carbon mass, substantially as and for the purpose stated.

7. The process of manufacturing nitrogen compounds from atmospheric nitrogen which essentially consists in providing a permeable mass of carbon, causing an incandescent-fluid heat-carrier composed of molten alkaline silicate to percolate in downward direction through the middle portion of, and simultaneously causing a current of atmospheric air to penetrate at an intermediate zone into said mass, causing the current of air to subdivide within said mass of carbon into a strong upward current, burning the carbon in contact therewith substantially to carbonic acid to add heat to the said heat-carrier, and into a weak downward current burning the carbon in contact therewith to carbonic oxid for further adding heat and preventing the reaction from being disturbed by the presence of carbonic acid, causing the gases to pass from below said carbonic-oxid-generating zone into a separator to separate therefrom the nitrogen compounds formed, providing the outflowing heat-carrier with fresh alkaline matter and returning it to the top of the said carbon mass, substantially as and for the purpose stated.

8. The process of manufacturing nitrogen compounds from atmospheric nitrogen, which essentially consists in providing a permeable mass of carbon, causing an incandescent-fluid alkaline silicate to percolate in downward direction through the middle portion of, and simultaneously causing a current of atmospheric air to penetrate at an intermediate zone into said mass of carbon, causing the air-current to subdivide within said carbon mass into an upward strong current burning the carbon in contact therewith substantially to carbonic acid, to add heat to the heat-carrier and into a downward weak current burning the carbon in contact therewith to carbonic oxid for further adding heat and preventing the reaction from being disturbed by the presence of carbonic acid, providing the outflowing heat-carrier with alkaline matter and returning it to the top of the carbon mass, causing the gases to pass from below the said carbonic-oxid-generating zone into a separator to separate therefrom the cyanids and other nitrogen compounds formed, decomposing the same into ammonia and alkaline compound, and utilizing the alkaline compound thus formed for providing the alkaline matter required in the process, substantially as and for the purpose stated.

In testimony whereof I have hereunto set my hand in presence of two subscribing witnesses.

HERMANN MEHNER.

Witnesses:
 WOLDEMAR HAUPT,
 HENRY HASPER.